US006705764B2

(12) United States Patent
Shang

(10) Patent No.: US 6,705,764 B2
(45) Date of Patent: Mar. 16, 2004

(54) PLUGGABLE OPTICAL TRANSCEIVER MODULE WITH ROTATABLE SEPARATING ROD

(75) Inventor: Chinhum Shang, Taoyuan Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 20 days.

(21) Appl. No.: 10/102,959

(22) Filed: Mar. 22, 2002

(65) Prior Publication Data

US 2003/0044121 A1 Mar. 6, 2003

(30) Foreign Application Priority Data

Aug. 30, 2001 (TW) ..................................... 90214891 U

(51) Int. Cl.⁷ ............................. G02B 6/36; G02B 6/42
(52) U.S. Cl. ........................ 385/53; 385/88; 439/352; 361/728
(58) Field of Search .................. 385/53, 88; 439/352, 439/357, 358; 361/728, 732

(56) References Cited

U.S. PATENT DOCUMENTS 5,580,268 A * 12/1996 Miyazawa ................. 439/352
6,430,053 B1 * 8/2002 Peterson et al. ............ 361/728
6,439,918 B1 * 8/2002 Togami et al. .............. 439/372
6,461,185 B2 * 10/2002 James ........................ 439/352
6,494,623 B1 * 12/2002 Ahrens et al. ................ 385/76
6,570,768 B2 * 5/2003 Medina ...................... 361/747
2003/0059167 A1 * 3/2003 Chiu et al. .................... 385/53

* cited by examiner

Primary Examiner—Michael C. Zarroli
(74) Attorney, Agent, or Firm—Birch, Stewart, Kolasch & Birch, LLP

(57) ABSTRACT

An optical transceiver module for a communication device. The communication device is provided with a printed circuit board, a socket, and a cage with an engaging member. The optical transceiver module comprises a chassis, an optical subassembly, a housing, and a separating portion. The chassis, having a protrusion, is disposed inside the cage in a removable manner. When the optical transceiver module is located inside the communication device, the chassis is located inside the cage and the protrusion engages the engaging member. The optical subassembly is disposed on the chassis. When the optical transceiver module is located inside the communication device, the optical subassembly connects with the socket. The housing is attached to the chassis so that the optical subassembly is located between the chassis and the housing. The separating portion, integrally formed on the chassis, pushes the engaging member to separate the protrusion and the engaging member so that the optical subassembly separates from the socket.

8 Claims, 11 Drawing Sheets

US 6,705,764 B2

PLUGGABLE OPTICAL TRANSCEIVER MODULE WITH ROTATABLE SEPARATING ROD

BACKGROUND OF THE INVENTION

1. Field of the Invention

The invention relates to an optical transceiver module; in particular, the invention relates to an easily removable optical transceiver module.

2. Description of the Related Art

Computers are increasingly being connected to communications lines and other devices or networks with the computers performing as servers for the peripherally connected computers or devices. The volume of data sent and received by the computer serving as a server of a network is such that the networks are advantageously constructed using fiber optic lines in order to increase the throughput of data.

Fiber optic lines and the associated fiber optic signals require transceivers to convert optical light pulse signals to electronic signals which are usable by the computer. Such an optical transceiver module includes a transmitter optical subassembly and a receiver optical subassembly to send and receive the optical signals.

Industry standards have been established to define the physical parameters of these modules and, particularly, the overall interface. This permits the interconnection of different devices manufactured by different manufacturers without the use of physical adapters.

Since about 1990, the fiber optic industry has been using a so-called "SC duplex fiber optic connector system" as the optical fiber connector interface on the front of fiber optic transceivers. The physical separation between the transmitter optical subassembly and receiver optical subassembly (TOSA and ROSA, respectively) for the SC duplex connector is approximately 12.7 mm. However, the industry is now converting to so-called "Small Form Factor optical connectors" and associated "Small Form Factor optical transceiver." In the so-called Small Form Factor optical connectors, the separation between the transmitter optical subassembly and receiver optical subassembly is established at approximately 6.25 mm, less than half the separation of the prior SC duplex connector. The Small Form Factor (SFF) standard establishes a module enclosure, having a 9.8 mm height and a width of 13.5 mm, and allows a minimum of 24 transceivers arranged across a standard rack opening. The reduction in size from the former SC duplex connector standard to the Small Form Factor standard requires both substantial redevelopment and redesign.

Moreover, the Small Form Factor optical fiber connector interface has been adopted as a standardized removable module. The optical transceiver module may be connected to a module interface on the host circuit board of a computer in a removable manner. Thus, when the optical transceiver module is abnormal, it can be removed from the circuit board so as to be checked.

Recently, referring to FIG. 1a, FIG. 1b, FIG. 1c, FIG. 1d and FIG. 1e, an optical transceiver module 20 is disposed on a communication device 10, such as a computer, in a hot plugged manner.

As shown in FIG. 1a, the communication device 10 comprises a case 11, a printed circuit board 12 and a cage 13. The case 11 is provided with a first opening 111 for the optical transceiver module 20 passing through.

As shown in FIG. 1b, the printed circuit board 12 is provided with a socket 14 thereupon, and the socket 14 is provided with a slot 141 for insertion of the optical transceiver module 20. The cage 13 is disposed on the printed circuit board 12, as shown in FIG. 1b, and it is provided with a second opening 131, a third opening 132, and an engaging member 133. The second opening 131 is used for the optical transceiver module 20 to pass through, and the third opening 132 is used for the socket 14 to pass through. The engaging member 133, having a hole 134, deflects in a predetermined range. In addition, since the cage 13 is provided with protrusions 135 at the bottom, there is a gap between the bottom of the cage 13 and the printed circuit board 12. Thus, when the cage 13 is disposed on the printed circuit board 12, the gap is used for deflection of the engaging member 133.

The conventional optical transceiver module 20 is shown in FIG. 1c, and is provided with a chassis 21, an optical subassembly 22 and a housing 23. The optical subassembly 22, disposed on the chassis 21, is used to convert the optical light pulse signals to electronic signals that are usable by the communication device 10. The housing 23 is attached to the chassis 21 so that the optical subassembly 22 is located between the chassis 21 and the housing 23. The chassis 21 is provided with a protrusion 211 and a sliding member 24 at the bottom.

Referring to FIG. 1d, to dispose the optical transceiver module 20 in the communication device 10, the optical transceiver module 20 passes through the first opening 111 of the case 11 in a manner such that the opposite side 231 of the chassis 21 of the optical transceiver module 20 faces the communication device 10. Then, the optical transceiver module 20 is located inside the cage 13 in the case 11, and the optical subassembly 22 electrically connects with the socket 14 and the protrusion 211 of the chassis 21 engages the hole 134 as shown in FIG. 1e. At this time, part of the chassis 21 is located outside the case 11, and such part includes the sliding member 24.

To remove the optical transceiver module 20 from the communication device 10, the sliding member 24 is pushed along an arrow X in FIG. 1e so as to deform the engaging member 133. Thus, the engaging member 133 is deformed so that the protrusion 211 disengages from the hole 134 on the engaging member 133. As a result, the optical transceiver module 20 is removed.

The conventional optical transceiver module 20 has the following disadvantages:

1. The removing action between the optical transceiver module 20 from the communication device 10 is inconvenient. Specifically, after the sliding member 24 is pushed along an arrow X to disengage the chassis 21 and the cage 13, the whole optical transceiver module 20 is pulled out along a direction opposite to the direction X. Thus, since the removing action requires two manual steps in different directions, it is very inconvenient for users.

2. Since the chassis 21 is provided with a sliding member 24, the assembly time and cost increase.

SUMMARY OF THE INVENTION

In order to address the disadvantages of the aforementioned optical transceiver module, the invention provides an easily removable optical transceiver module.

Accordingly, the invention provides an optical transceiver module adapted for a cage with an engaging member. The optical transceiver module comprises a chassis and a separating portion. The chassis, having a protrusion, is disposed inside the cage in a removable manner. The protrusion engages the engaging member when the chassis is located inside the cage. The separating portion, integrally formed on the chassis, pushes the engaging member to separate the protrusion and the engaging member.

In a preferred embodiment, the separating portion comprises a main rod and an actuating rod. The main rod is integrally formed on the chassis. The actuating rod is integrally formed on the main rod in a manner such that can rotate around the main rod.

Furthermore, the actuating rod is provided with a push part and a prying part for prying the engaging member, and the push part and the prying part rotate in opposite directions around the main rod.

Furthermore, a portion, abutting the engaging member, of the prying part is V-shaped.

In another preferred embodiment, the engaging member is provided with a hole for engaging the protrusion.

In another preferred embodiment, the optical transceiver module further comprises an optical subassembly and a housing. The optical subassembly is disposed on the chassis. The housing is attached to the chassis so that the optical subassembly is located between the chassis and the housing.

In another preferred embodiment, the invention provides an optical transceiver module for a communication device. The communication device is provided with a printed circuit board, a socket, and a cage with an engaging member. The optical transceiver module comprises a chassis, an optical subassembly, a housing, and a separating portion. The chassis, having a protrusion, is disposed inside the cage in a removable manner. When the optical transceiver module is located inside the communication device, the chassis is located inside the cage and the protrusion engages the engaging member. The optical subassembly is disposed on the chassis. When the optical transceiver module is located inside the communication device, the optical subassembly connects with the socket. The housing is attached to the chassis so that the optical subassembly is located between the chassis and the housing. The separating portion, integrally formed on the chassis, pushes the engaging member to separate the protrusion and the engaging member so that the optical subassembly separates from the socket.

BRIEF DESCRIPTION OF THE DRAWINGS

The invention is hereinafter described in detail with reference to the accompanying drawings in which:

FIG. 1b is a schematic view depicting parts inside the communication device in FIG. 1a;

FIG. 2b is a perspective view depicting the optical transceiver module in FIG. 2a;

FIG. 3b is a side view depicting the separating portion in FIG. 3a;

DETAILED DESCRIPTION OF THE INVENTION

Figure 1A:
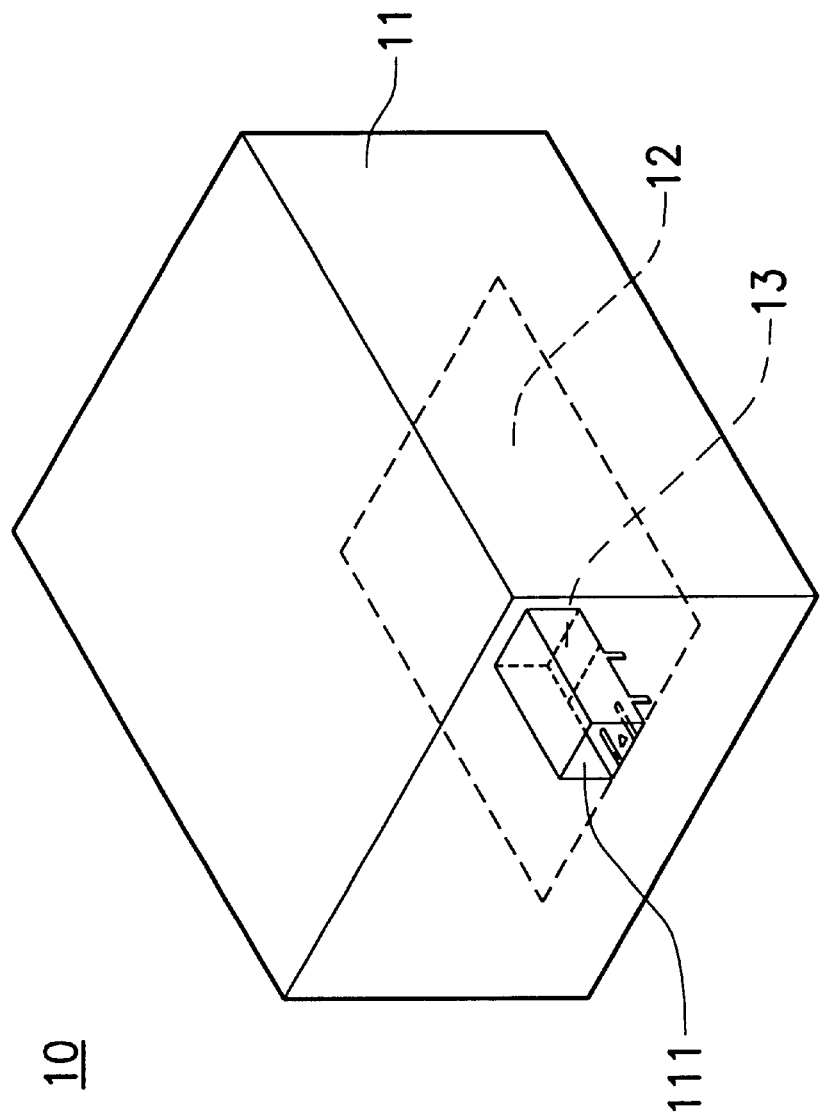
FIG. 1a is a schematic view depicting a communication device.
Figure 1B:
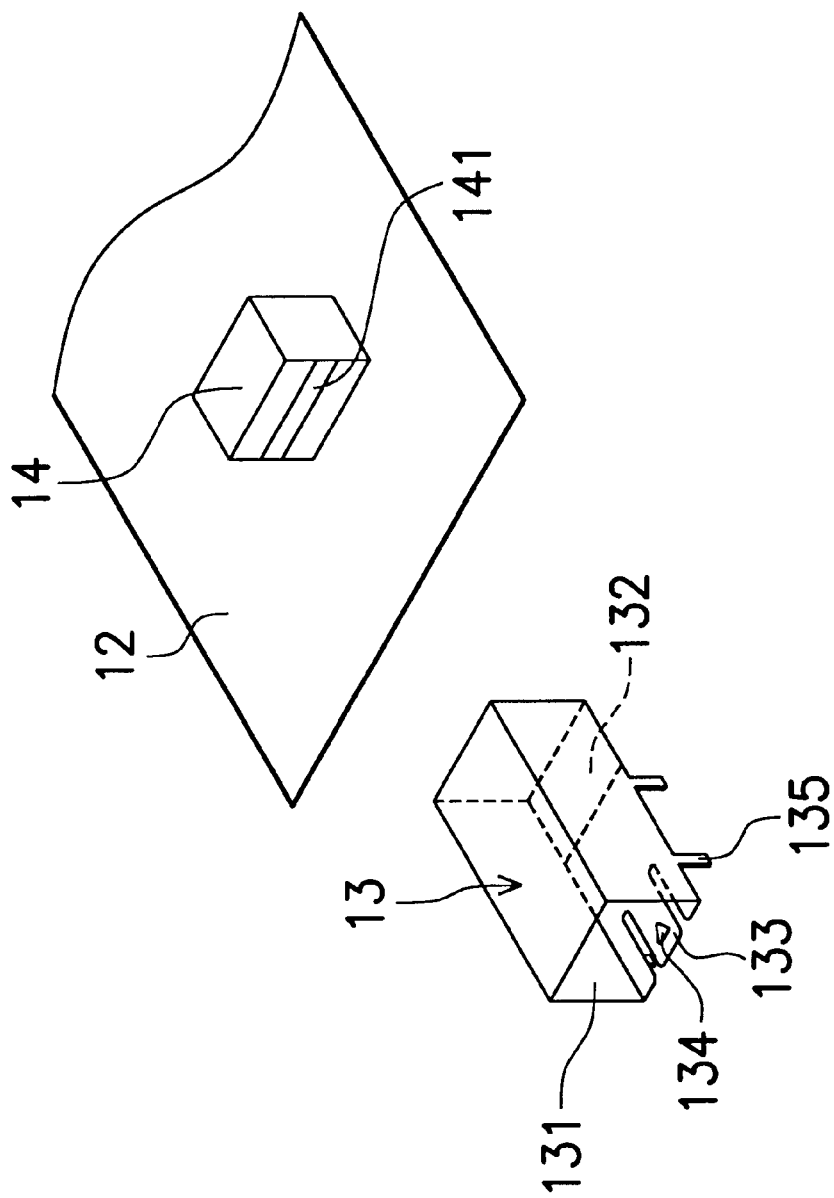
Figure 1C:
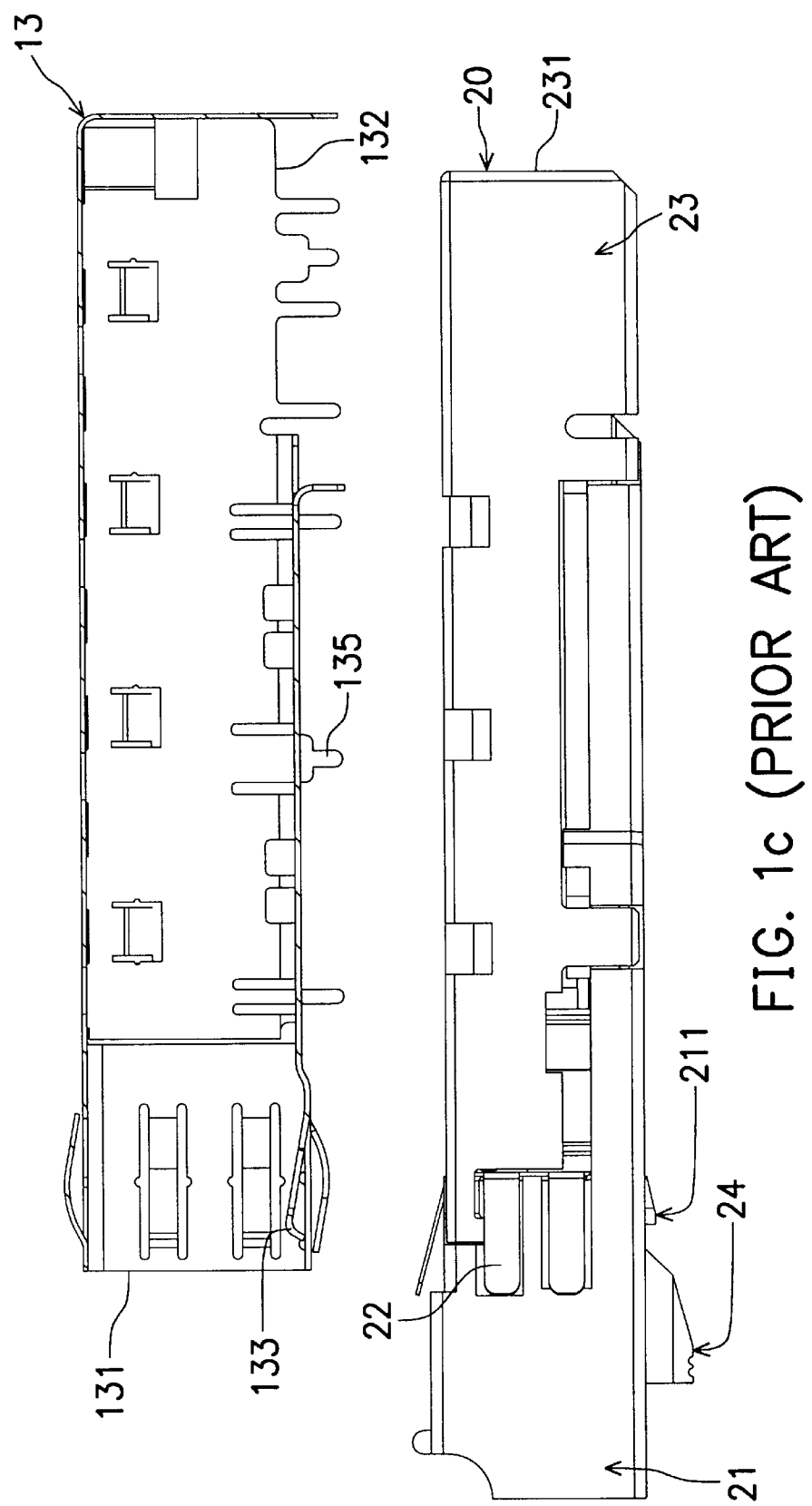
FIG. 1c and FIG. 1d are schematic views depicting a conventional optical transceiver module and a cage in FIG. 1b.
Figure 1D:
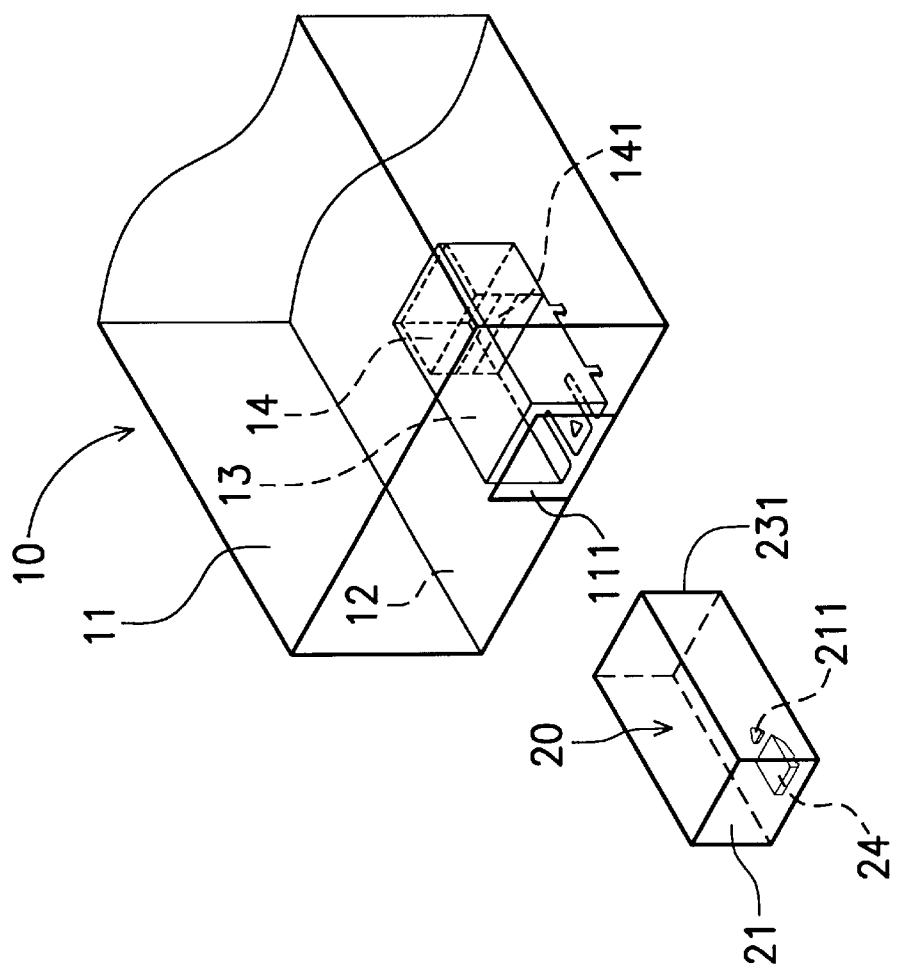
Figure 1E:
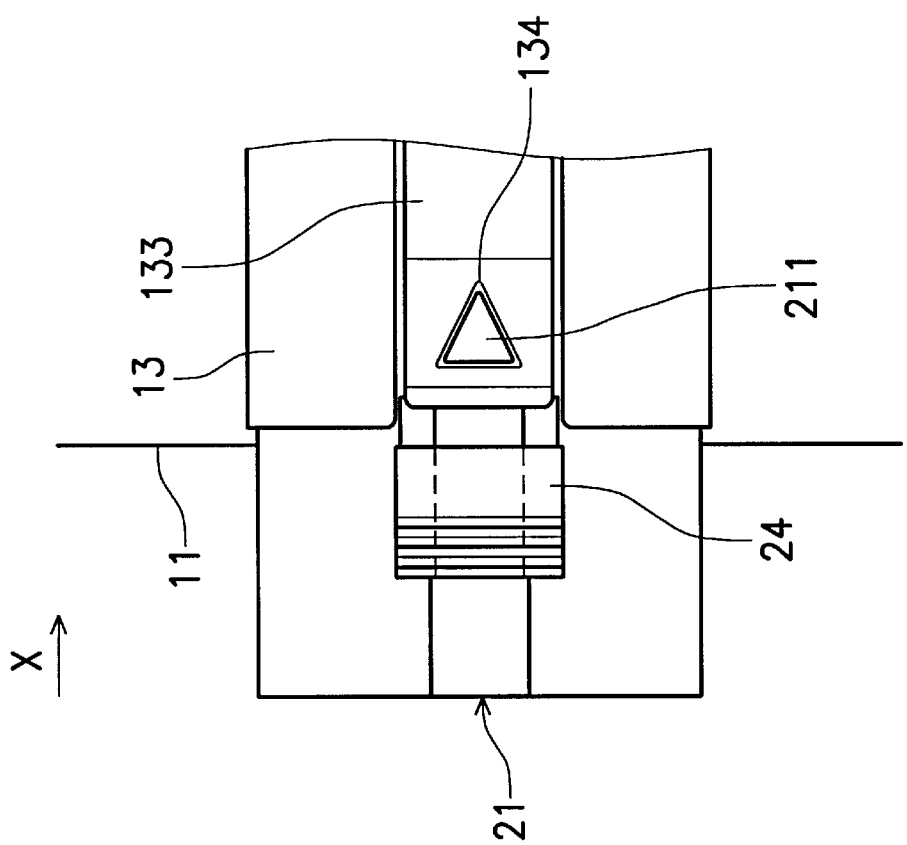
FIG. 1e is a bottom view depicting the conventional optical transceiver module engaging the cage.
Figure 2A:
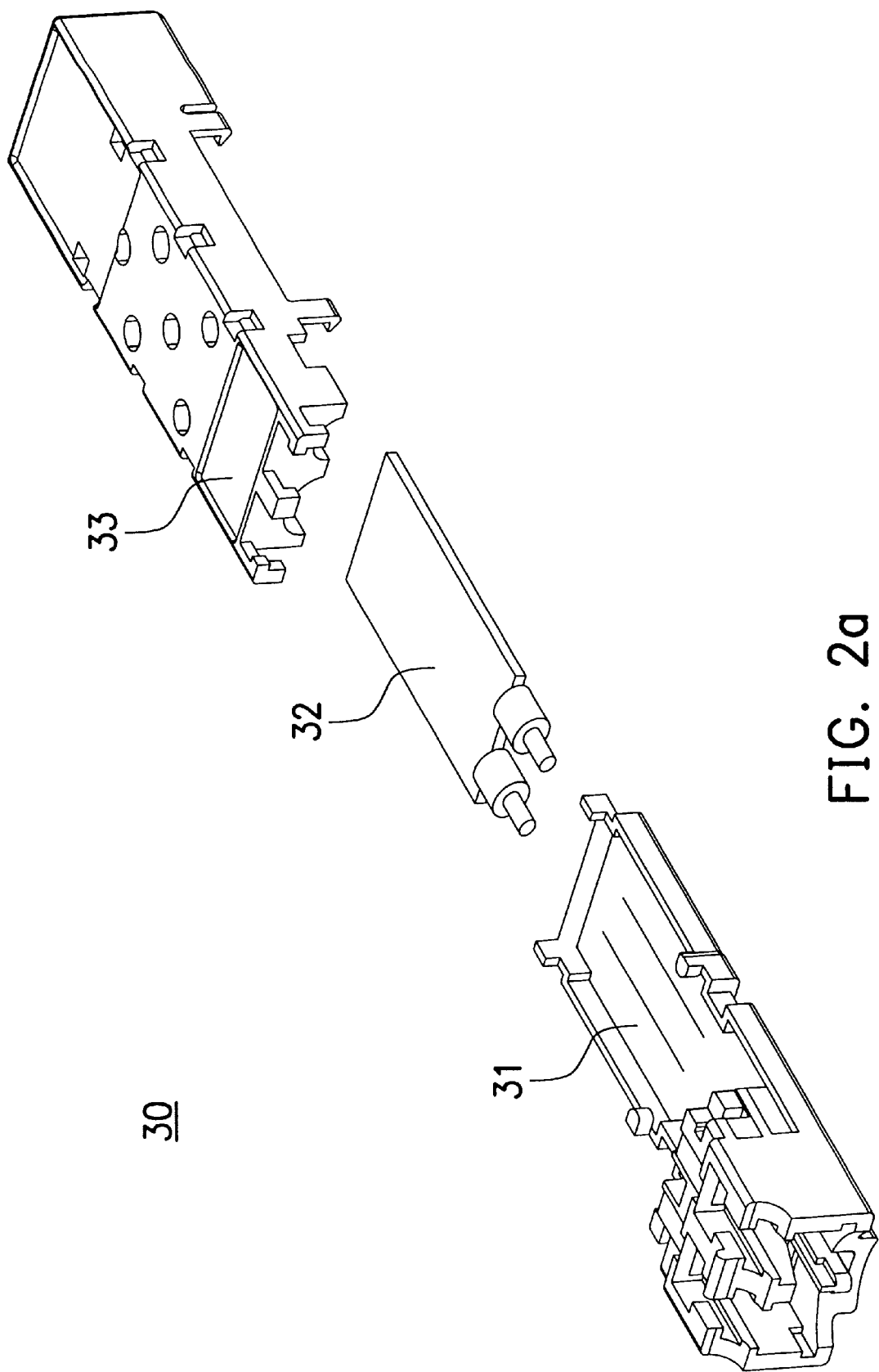
FIG. 2a is an exploded view depicting an optical transceiver module as disclosed in this invention.
Figure 2B:
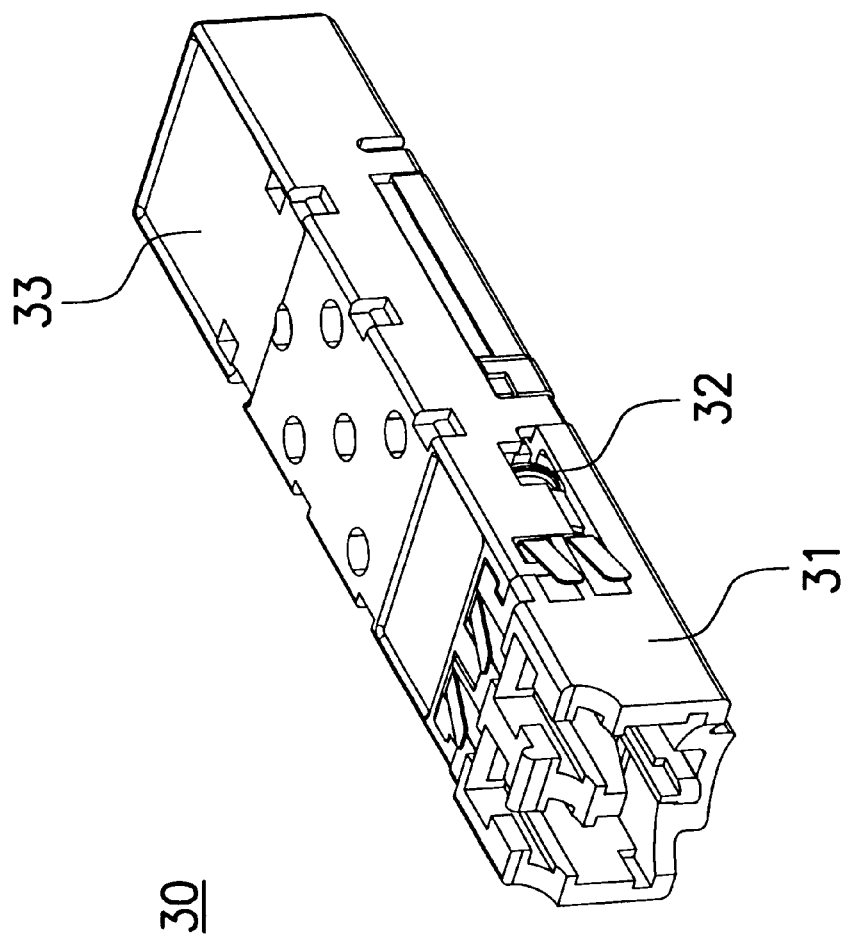
Figure 2C:
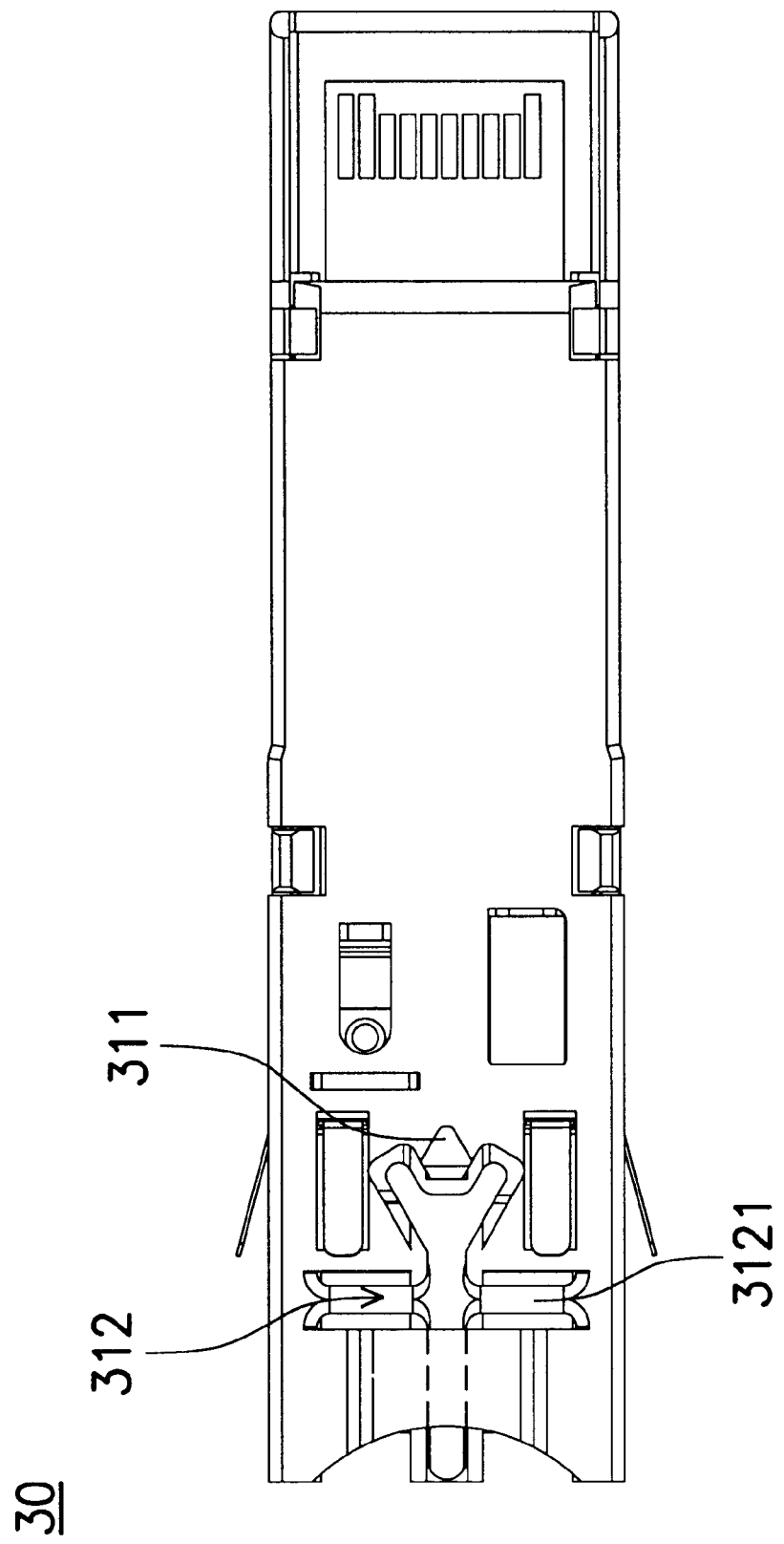
FIG. 2c is a bottom view depicting the optical transceiver module in FIG. 2b.
Figure 4:
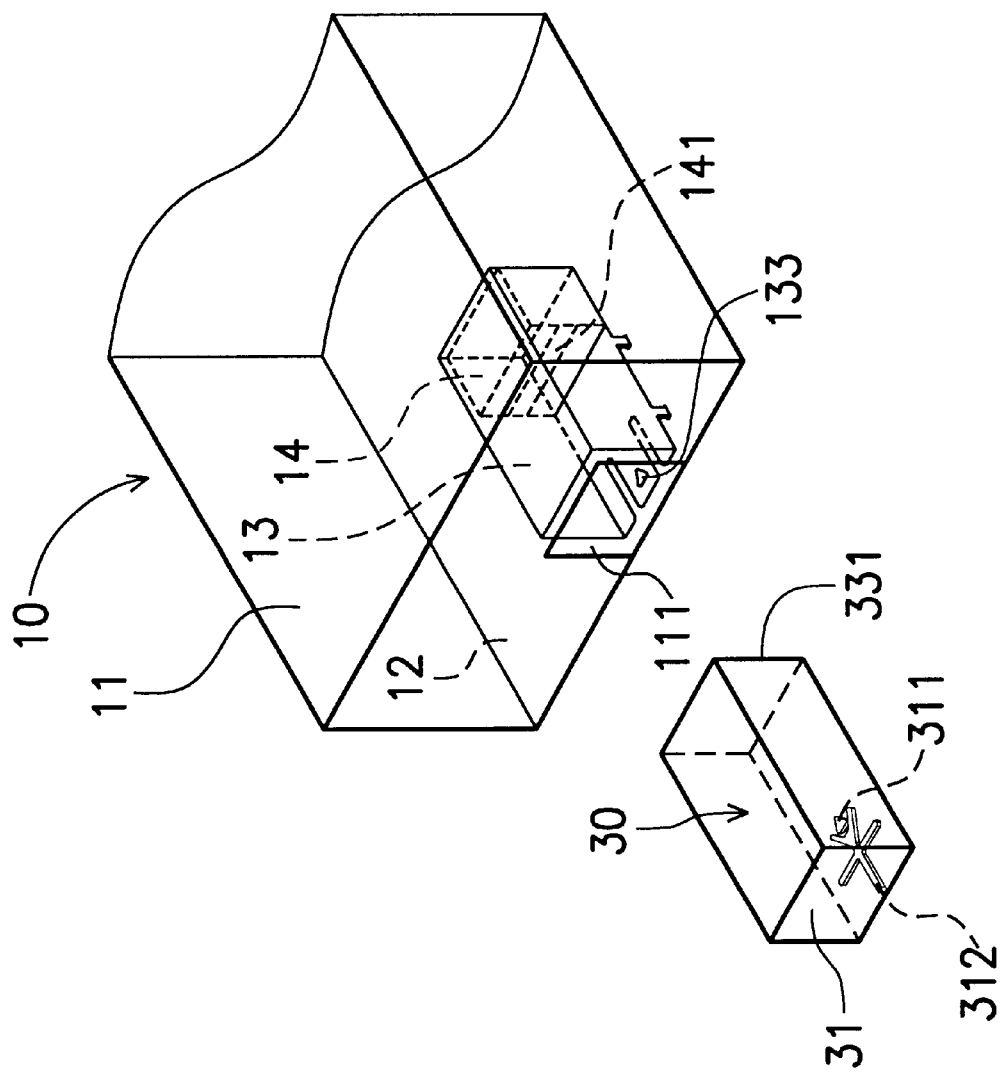
FIG. 4 is a schematic view depicting the optical transceiver module as disclosed in this invention and the cage in FIG. 1b.

Referring to FIG. 2a, FIG. 2b and FIG. 2c, an optical transceiver module 30 as disclosed in this invention is adapted for a communication device 10 as shown in FIG. 4. The communication device 10 is provided with a printed circuit board 12, a socket 14 disposed on the printed circuit board 12, and a cage 13 with an engaging member 133 having a hole 134.

As shown in FIG. 2a, FIG. 2b and FIG. 2c, the optical transceiver module 30 comprises a chassis 31, an optical subassembly 32, a housing 33, and a separating portion 312. The chassis 31 is used as a base of the optical transceiver module 30, and is disposed inside the cage 13 of the communication device 10 in a removable manner. Also, the chassis 30 is provided with a protrusion 311 at the bottom, and the protrusion 311 engages the hole 134 of the engaging member 133 when the chassis 31 of the optical transceiver module 30 is located inside the cage 13 of the communication device 10.

The optical subassembly 32 is disposed on the chassis 31. Like the conventional module, when the optical transceiver module 30 is located inside the communication device 10, the optical subassembly 32 electrically connects with the socket 14 to convert the optical light pulse signals to electronic signals that are usable by the communication device 10.

The housing 33 is used to protect the optical subassembly 32, and is attached to the chassis 31 so that the optical subassembly 32 is located between the chassis 31 and the housing 33.

The separating portion 312 is integrally formed on the chassis 31, and pushes the engaging member 133 of the cage 13 to separate the protrusion 311 of the chassis 31 and the hole 134 of the engaging member 133 so that the optical subassembly 32 of the optical transceiver module 30 separates from the socket 14 of the communication device 10.

Figure 3A:
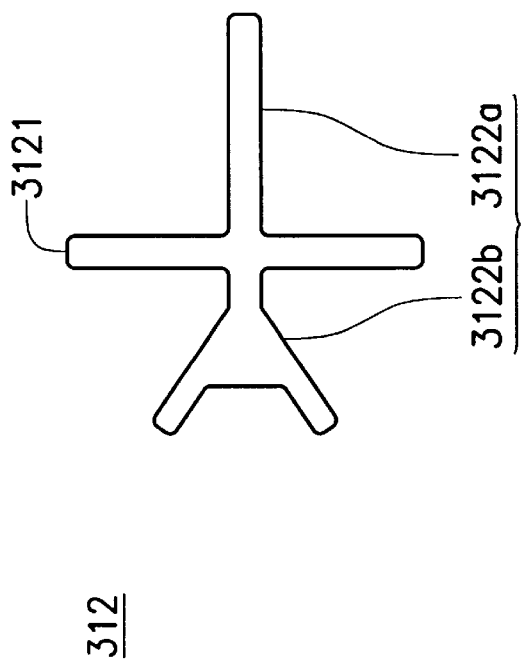
FIG. 3a is a top view depicting a separating portion in FIG. 2c.
Figure 3B:
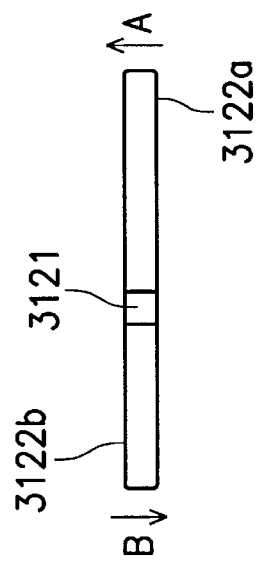

Referring to FIG. 3a and FIG. 3b, the separating portion 312 comprises a main rod 3121 and an actuating rod 3122. The main rod 3121 is integrally formed on the chassis 31. The actuating rod 3122 is integrally formed on the main rod 3121 in a manner such that it can rotate around the main rod 3121. The actuating rod 3122 can be divided into a push part 3122a and a prying part 3122b by the main rod 3121. A portion, abutting the engaging member 133, of the prying part 3122b is V-shaped. When the push part 3122a moves along an arrow A in FIG. 3b, the prying part 3122b moves along an arrow B (opposite to the arrow A) in FIG. 3b. That is, the push part 3122a and the prying part 3122b rotate in opposite directions around the main rod 3121.

Figure 5:
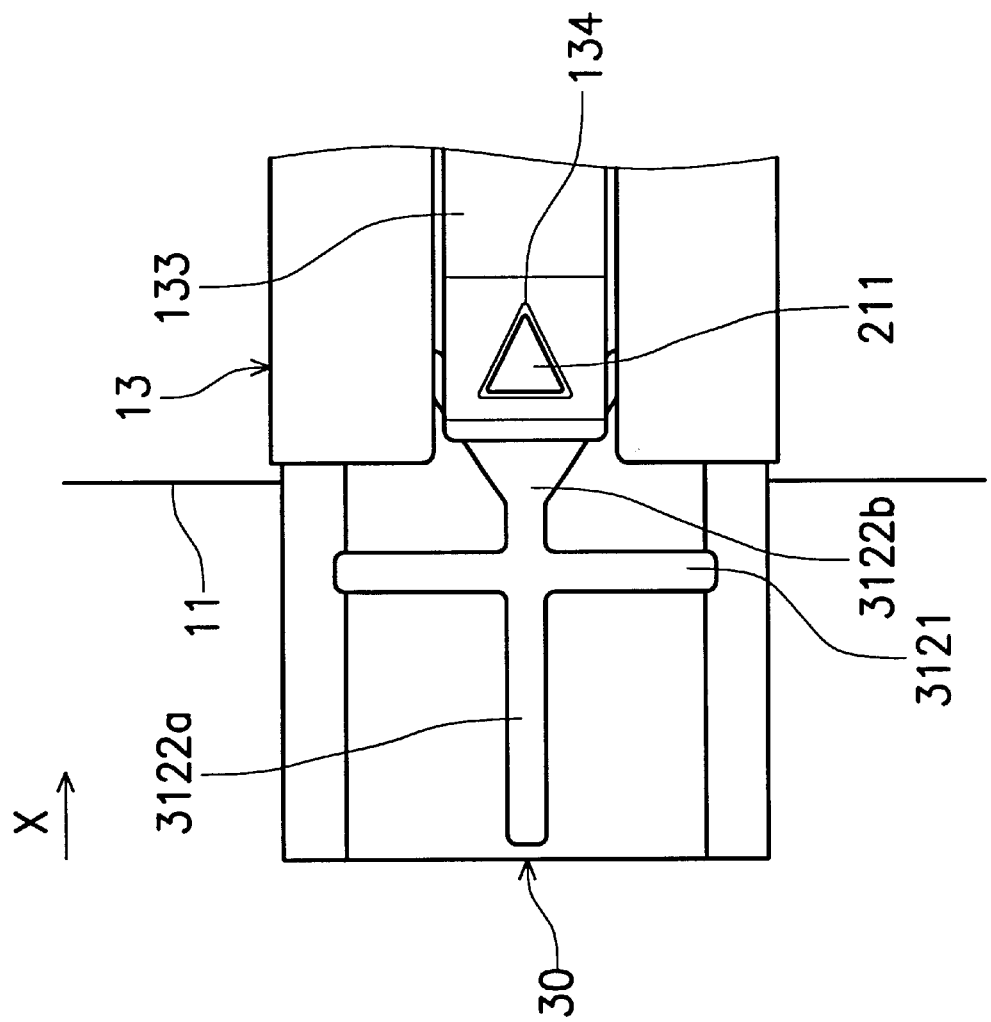
FIG. 5 is a bottom view depicting the optical transceiver module engaging the cage in FIG. 4.

Referring to FIG. 4, to dispose the optical transceiver module 30 in the communication device 10, the optical transceiver module 30 passes through the first opening 111 of the case 11 in a manner such that the opposite side 331 of the chassis 31 of the optical transceiver module 30 faces the communication device 10. Then, the optical transceiver module 30 is located inside the cage 13 in the case 11, and the optical subassembly 32 electrically connects with the socket 14 and the protrusion 311 of the chassis 31 engages the hole 134 as shown in FIG. 5. At this time, a portion of the chassis 31 is located outside the case 11, and such portion includes the push part 3122a of the actuating rod 3122 of the separating portion 312.

To remove the optical transceiver module 30 from the communication device 10, the push part 3122a of the actuating rod 3122 of the separating portion 312 is pushed along the arrow A in FIG. 3b so that the prying part 3122b moves along the arrow B in FIG. 3b. Thus, the V-shaped portion of the prying part 3122b pries the engaging member 133 so that the protrusion 311 disengages from the hole 134 on the engaging member 133. As a result, the optical transceiver module 30 is removed.

In addition, in this embodiment, the push part 3122a of the actuating rod 3122 of the separating portion 312 is pushed upward to disengage the protrusion 311 from the hole 134; however, the removing manner is not limited to this. For example, the protrusion 311 can be integrally formed on the push part 3122a of the actuating rod 3122. At this time, the push part 3122a of the actuating rod 3122 of the separating portion 312 is pushed downward to rotate the prying part 3122b upward. Thus, the protrusion 311, formed on the prying part 3122b, separates from the hole 134.

The optical transceiver module, as disclosed in this invention, has the following advantages:

1. Since the separating portion pries the engaging member in a rotatable manner, the optical transceiver module can be easily removed from the communication device.

2. Since the separating portion is integrally formed on the chassis, the assembly time and cost can be reduced.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An optical transceiver module, adapted for a cage with an engaging member, comprising:
   a chassis, having a protrusion, disposed inside the cage in a removable manner, wherein the protrusion engages the engaging member when the chassis is located inside the cage;
   a separating portion, integrally formed on the chassis, for pushing the engaging member to separate the protrusion and the engaging member, wherein the separating portion comprises:
   a main rod integrally formed on the chassis; and
   an actuating rod integrally formed on the main rod in a manner such that the actuating rod can rotate around the main rod.

2. The optical transceiver module as claimed in claim 1, wherein the actuating rod is provided with a push part and a prying part for prying the engaging member, and the push part and the prying part rotate in opposite directions around the main rod.

3. The optical transceiver module as claimed in claim 2, wherein a portion, abutting the engaging member, of the prying part is V-shaped.

4. An optical transceiver module for a communication device, having a printed circuit board, a socket, and a cage with an engaging member, comprising:
   a chassis, having a protrusion, disposed inside the cage in a removable manner, wherein the chassis is located inside the cage and the protrusion engages the engaging member when the optical transceiver module is located inside the communication device;
   an optical subassembly disposed on the chassis, wherein the optical subassembly connects with the socket when the optical transceiver module is located inside the communication device;
   a housing attached to the chassis so that the optical subassembly is located between the chassis and the housing; and
   a separating portion, integrally formed on the chassis, for pushing the engaging member to separate the protrusion and the engaging member so that the optical subassembly separates from the socket.

5. An optical transceiver module for a communication device, having a printed circuit board, a socket, and a cage with an engaging member, comprising:
   a chassis, having a protrusion, disposed inside the cage in a removable manner, wherein the chassis is located inside the cage and the protrusion engages the engaging member when the optical transceiver module is located inside the communication device;
   an optical subassembly disposed on the chassis, wherein the optical subassembly connects with the socket when the optical transceiver module is located inside the communication device;
   a housing attached to the chassis so that the optical subassembly is located between the chassis and the housing;
   a separating portion, integrally formed on the chassis, for pushing the engaging member to separate the protrusion and the engaging member so that the optical subassembly separates from the socket, wherein the separating portion comprises:
   a main rod integrally formed on the chassis; and
   an actuating rod integrally formed on the main rod in a manner such that can rotate around the main rod.

6. The optical transceiver module as claimed in claim 5, wherein the actuating rod is provided with a push part and a prying part for prying the engaging member, and the push part and the prying part rotate in opposite directions around the main rod.

7. The optical transceiver module as claimed in claim 6, wherein a portion, abutting the engaging member, of the prying part is V-shaped.

8. The optical transceiver module as claimed in claim 4, wherein the engaging member is provided with a hole for engaging the protrusion.

* * * * *